FIG. I

Sam D. Stahley
Glenn W. Travis,
    INVENTORS.

March 1, 1966 S. D. STAHLEY ETAL 3,237,975
BALANCED FLUID COUPLING JOINT
Filed June 26, 1963 2 Sheets-Sheet 2

Sam D. Stahley
Glenn W. Travis,
INVENTORS.

3,237,975
BALANCED FLUID COUPLING JOINT
Sam D. Stahley, Huntsville, and Glenn W. Travis, Hartselle, Ala., assignors, by direct and mesne assignments, to the United States of America as represented by the Secretary of the Army
Filed June 26, 1963, Ser. No. 290,872
1 Claim. (Cl. 285—300)

The invention described herein may be manufactured and used by or for the Government for governmental purposes without the payment of any royalty thereon.

This invention relates to fluid flow line joints and more particularly to force balancing joints for use in flow lines handling high pressure fluids.

In any high pressure fluid system, the contained fluid produces axial thrust in the system's flow lines which tends to elongate the flow lines. If the flow lines have fixed end points, the elongation strain will often rupture the flow line. Such ruptures have occurred in missile liquid oxygen fueling systems. In such systems, a mast is used to convey the liquid oxygen from a storage tank into the missile. Since the mating point of mast and missile is easily disconnected, any elongation of the mast during the fueling operation will cause the mast to separate from the missile, disrupting the fueling operation.

It is an object of this invention to provide a force balancing joint which compensates for any axial deformation of a flow line carrying a pressurized fluid.

Another object of this invention is to provide a force balancing joint which expands or contracts to compensate respectively for a contraction or expansion of the fluid flow line.

Still another object of this invention is to provide a force balancing joint which utilizes a system of bellows members to negate axial deformation of a flow line carrying high pressure fluid.

Figure 1:
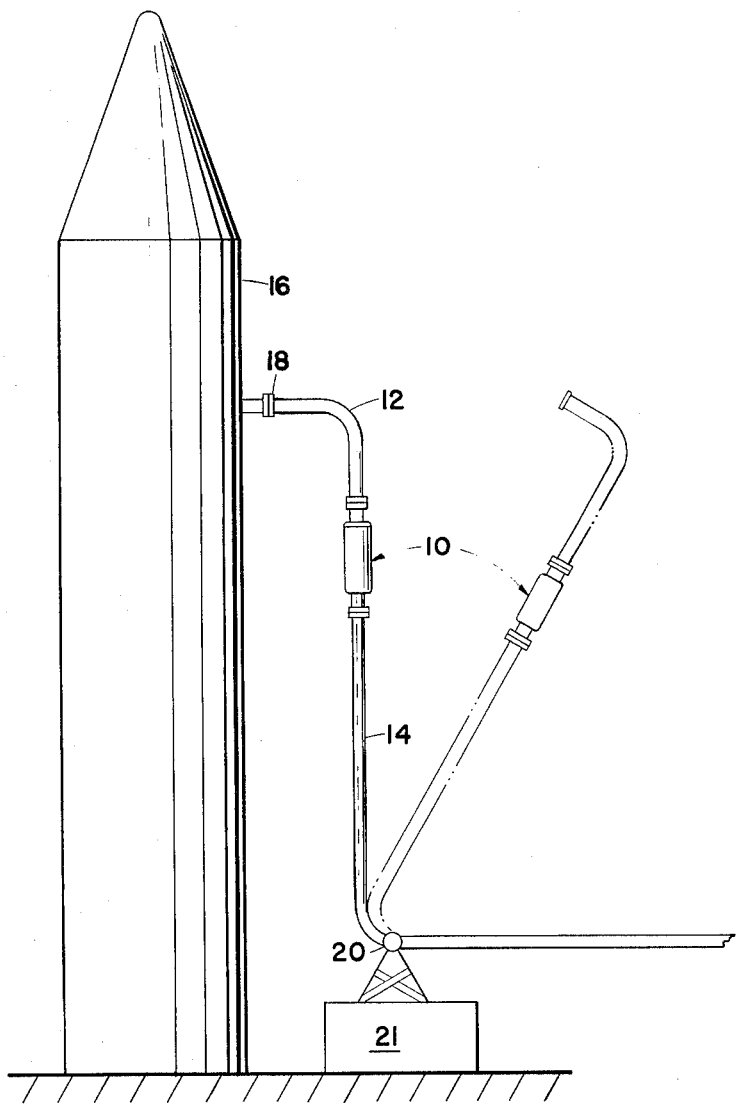
Figure 2:
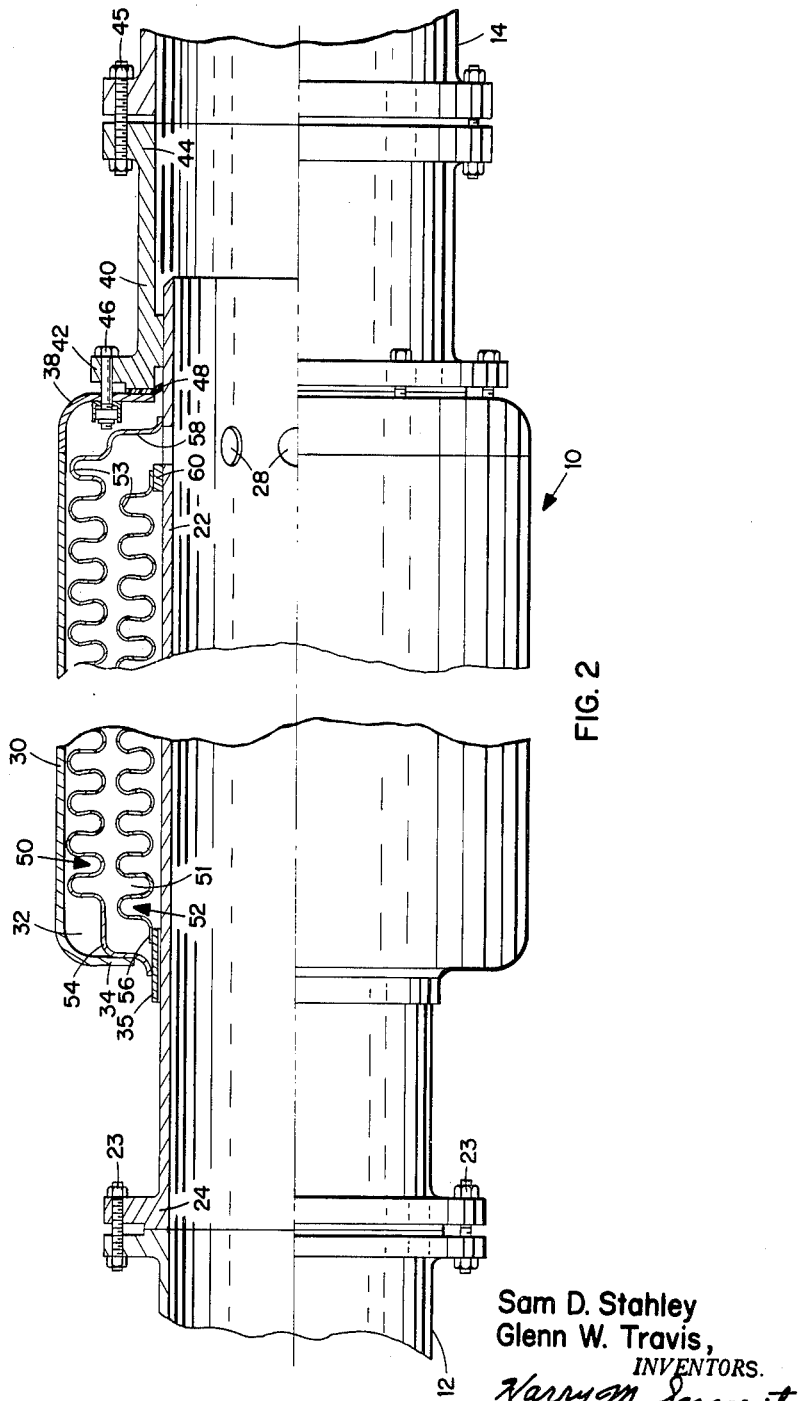

These and other objects of the invention will become more apparent upon consideration of the following detailed description and accompanying drawings, in which:

FIGURE 1 shows the force balancing joint utilized in a missile fueling mast; and FIGURE 2 is a foreshortened sectional view of the force balancing joint.

Referring to the drawings, FIGURE 1 shows a missile 16 in launch position with two mast sections 12 and 14 connected for fueling the missile. A force balancing joint 10 is connected between the two mast sections. Mast section 12 is attached to missile 16 at fuel intake 18. The connection at intake 18 is attached in such a manner that it may easily be released to facilitate removal of the mast. Mast section 14 is connected to a fueling source (not shown) and is pivotably supported about a fixed pivot point 20 by a suitable support structure 21. Pivot point 20 allows the mast sections to be rotated away from the missile upon completion of the fueling operation as shown in phantom in FIGURE 1.

FIGURE 2 shows force balancing joint 10 to include a fluid carrying inner conduit section 22 having a flanged end 24 connected to mast section 12 by bolts 23. Adjacent the other end of conduit section 22 are a plurality of spaced circumferential apertures 28. Apertures 28 provide a bleed for fluids passing through inner conduit 22 for purposes described hereinbelow.

A first outer conduit section 30 is disposed about inner conduit 22 to form a compartment 32 therebetween. Outer conduit section 30 has one end 34 attached through end portion 54 of bellows 50 to an annular sleeve 35 which in turn is slidably mated with inner conduit section 22. The other end of section 30 is attached to an annular cup shaped member 38.

A second outer conduit section 40 which slidably engages the outer surface of section 22 has a flanged end 42 fixed to member 38 by bolts 46. A seal 48 is disposed between member 38 and flanged end 42 extends therefrom to abut the outer surface of inner conduit 22 to provide a slidable fluid tight seal between inner conduit 22 and second outer conduit section 40. Flanged end 44 of section 40 is attached to mast section 14 by bolts 45.

The expansion or contraction of the force balancing joint is controlled by external and internal bellows 50 and 52 respectively, concentrically disposed in compartment 32. The disposition of the bellows defines a chamber 51 therebetween having a cross-sectional area substantially equal to the cross-sectional area of inner conduit 22 for purposes explained hereinbelow. Convolutions 53 of the bellows are arranged to allow deformation in a direction parallel to the longitudinal axis of the mast sections 12 and 14. Adjoining ends 54 and 56 of external and internal bellows 50 and 52 respectively are integrally fixed to sleeve 35. Adjoining bellows ends 58 and 60 are integrally fixed to inner conduit section 22 on either side of apertures 28, allowing fluid to bleed from inner conduit section 22 into chamber 51.

In operation the force balancing joint 10 is used to connect two fueling mast sections 12 and 14 as shown in FIGURES 1 and 2. The mast conveys a high pressure fuel, such as liquid oxygen, into the missile.

The pressure of the flowing fuel exerts a force on the mast which is proportional to the mast's internal cross-sectional area. This force acts in a direction toward producing axial deformation of the mast. Since mast 14 is pivoted about fixed point 20, an axial deformation force will be directed to intake 18 tending to break the connection between mast and missile, aborting the fueling operation.

Force balancing joint 10 compensates for axial deformation of the mast allowing the connection at intake 18 to be maintained, in the following manner.

Chamber 51, as stated hereinabove, has a cross-sectional area substantially equal to the cross-sectional area of inner conduit section 22. This insures the generation of axial bellows deformation forces substantially equal and opposite to the axial deformation forces in inner sleeve section 22 and mast sections 12 and 14 produced by the pressurized fluids flowing through the system.

A portion of the pressurized fuel passing through the mast sections is bled from inner conduit section 22 through apertures 28 into chamber 51. The pressurized fuel in chamber 51 acts on the bellows members 50 and 52 in a direction toward expansion of the members in an axial direction. With ends 54 and 56 of the bellows being affixed to sleeve 35 and ends 58 and 60 being affixed to inner conduit section 22, the force produced by fluid pressure acting in chamber 51 will counteract the axial deformation force in the mast and thereby maintain a substantially constant overall length of mast from point 20 to intake 18 irrespective of the pressure of the high pressure fuel.

Thus, it will be appreciated that this invention provides a force balancing joint which prevents axial deformation of flow lines having fixed end points.

It is to be understood that various modifications of the force balancing joint described herein may be made without changing the spirit and scope of the invention as claimed.

We claim:

A fluid coupling joint comprising: an inner conduit section with a uniform outer diameter portion at a first end thereof, a flange at the other end thereof, and circumferential apertures through said inner conduit section adjacent said first end thereof; a first outer conduit section slidably disposed about said inner conduit section; an annular sleeve slidably mated with said inner conduit section and secured to said first outer conduit section at one end thereof; resilient means connected between said inner and first outer conduit sections, said resilient means including an outer bellows secured at one end to said inner conduit section between said apertures and said first end and at the other end to said first outer conduit section, and an inner bellows secured at one end to said inner conduit section on an opposite side of said apertures from said outer bellows and at the other end to said sleeve whereby said inner and outer bellows form a chamber therebetween to adapt said first outer conduit section to have longitudinal movement with respect to said inner conduit section in response to actuation of said resilient means; an annular cup-shaped member attached to the other end of said first outer conduit section to form a compartment between said inner and first outer conduit sections, the base of said cup-shaped member forming an inturned flange that terminates adjacent said uniform outer diameter portion; a second outer conduit section having a flange on one end and slidably disposed about the first end of said inner conduit section; a washer shaped seal disposed between said inturned flange and said flange on said second outer conduit section and sealably and slidably abutting the outer surface of said inner conduit section; and releasable means securing said flange on said second outer conduit section to said inturned flange and clamping said seal between said inturned flange and said flange on said second outer conduit section.

References Cited by the Examiner
UNITED STATES PATENTS

| | | | |
|---|---|---|---|
| 1,939,936 | 12/1933 | Walker et al. | |
| 2,348,833 | 5/1944 | Miller | 285—228 |
| 2,437,385 | 3/1948 | Halford | 285—227 X |
| 2,873,984 | 2/1959 | Anderson et al. | 285—228 |

FOREIGN PATENTS

| | | |
|---|---|---|
| 258,088 | 5/1949 | Switzerland. |

CARL W. TOMLIN, *Primary Examiner.*

D. W. AROLA, *Assistant Examiner.*